US010750455B2

(12) United States Patent
Medina Acosta et al.

(10) Patent No.: US 10,750,455 B2
(45) Date of Patent: Aug. 18, 2020

(54) SYSTEMS AND METHODS FOR POWER ALLOCATION IN UPLINK MULTICARRIER SCENARIOS FOR MIXED TRANSMISSION TIME INTERVALS

(71) Applicant: Telefonaktiebolaget LM Ericsson (publ), Stockholm (SE)

(72) Inventors: Gerardo Agni Medina Acosta, Märsta (SE); Christopher Callender, Kinross (GB); Cecilia Eklöf, Täby (SE); Waikwok Kwong, Solna (SE); Kazuyoshi Uesaka, Kanagawa (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/337,992

(22) PCT Filed: Sep. 29, 2017

(86) PCT No.: PCT/EP2017/074896
§ 371 (c)(1),
(2) Date: Mar. 29, 2019

(87) PCT Pub. No.: WO2018/060493
PCT Pub. Date: Apr. 5, 2018

(65) Prior Publication Data
US 2019/0239169 A1    Aug. 1, 2019

Related U.S. Application Data

(60) Provisional application No. 62/402,276, filed on Sep. 30, 2016.

(51) Int. Cl.
*H04W 52/34* (2009.01)
*H04W 52/14* (2009.01)
*H04W 52/36* (2009.01)

(52) U.S. Cl.
CPC ....... *H04W 52/346* (2013.01); *H04W 52/146* (2013.01); *H04W 52/367* (2013.01)

(58) Field of Classification Search
CPC ............ H04W 52/346; H04W 52/146; H04W 52/367; H04W 52/3461; H04W 52/0473
(Continued)

(56) References Cited

PUBLICATIONS

3GPP TSG-RAN4 Meeting #54; San Francisco, USA; Change Request; Title; ETFC Restriction for DC-HSUPA; Source to WG: Nokia, Nokia Siemens Networks, InterDigital, Ericsson, ST-Ericsson; Source to TSG: RAN WG4 (R4-100995)—Feb. 22-26, 2010 (Year: 2010).*
(Continued)

*Primary Examiner* — Edward F Urban
*Assistant Examiner* — Angelica M Perez
(74) *Attorney, Agent, or Firm* — Baker Botts, LLP

(57) ABSTRACT

A method in a wireless device for determining a power allocation for an uplink transmission and a wireless device configured for determining a power allocation for an uplink transmission. Wherein the power allocation is based on a remaining power for scheduled transmissions derived from a maximum transmitter power of the wireless device, less any power for non-scheduled transmissions and a reserved power for any scheduled data transmission on the second frequency derived from a filtered power of a dedicated physical control channel, DPCCH, and a power offset for an enhanced-transport format combination, E-TFC, of a transmission for the second frequency configured with the second TTI, wherein the filtered power is averaged over a number of slots having a total duration equal to the second TTI length.

21 Claims, 8 Drawing Sheets

(58) Field of Classification Search
USPC .......................................... 455/522; 370/318
See application file for complete search history.

(56) References Cited

PUBLICATIONS

3GPP TSG-RAN WG4 Meeting Ad Hoc #2010-01; Sophia Antipolis, France; Source: Qualcomm incorporated; Title: E-TFC Selection in UE for DC-HSUPA (R4-100208)—Jan. 18-22, 2010 (Year: 2010).*
3GPP TSG RAN Meeting #72; Susan, Korea; 3GPP Work Item Description; Title: Multi-Carrier Enhancements for UMTS (RP-161259)—Jun. 13-16, 2016.
3GPP TR 25.707 v1.0.0; Technical Report; 3rd Generation Partnership Project; Technical Specification Group Radio Access Network; Multi-Carrier Enhancements for UMTS (Release 14)—Jun. 2016.
3GPP TS 25.101 v14.0.0; Technical Report; 3rd Generation Partnership Project; Technical Specification Group Radio Access Network; User Equipment (UE) radio transmission and reception (FDD) (Release 14)—Jun. 2016.
3GPP TS 25.133 v14.0.0; Technical Specification; 3rd Generation Partnership Project; Technical Specification Group Access Network; Requirements for support of radio resource management (FDD) (Release 14)—Jun. 2016.
3GPP TS 25.214 v13.3.1; Technical Specification; 3rd Generation Partnership Project; Technical Specification Group Radio Access Network; Physical layer procedures (FDD) (Release 13)—Jul. 2016.
3GPP TS 25.321 v13.2.0; Technical Specification; 3rd Generation Partnership Project; Technical Specification Group Radio Access Network; Medium Access Control (MAC) protocol specification (Release 13)—Mar. 2016.
3GPP TS 25.331 v13.3.0; Technical Specification; 3rd Generation Partnership Project; Technical Specification Group Radio Access Network; Radio Resource Control (RRC); Protocol specification (Release 13)—Jun. 2016.
3GPP TSG-RAN4 Meeting #54; San Francisco, USA; Change Request; Title; ETFC Restriction for DC-HSUPA; Source to WG: Nokia, Nokia Siemens Networks, InterDigital, Ericsson, ST-Ericsson; Source to TSG: RAN WG4 (R4-100995)—Feb. 22-26, 2010.
3GPP TSG RAN WG1 Meeting #86; Gothenburg, Sweden; Source: Huawei, HiSilicon; Title: Initial considerations on power scaling (R1-167686)—Aug. 22-26, 2016.
International Search Report for International application No. PCT/EP2017/074896—dated Nov. 13, 2017.
3GPP TSG-RAN WG4 Meeting Ad Hoc #2010-01; Sophia Antipolis, France; Source: Qualcomm Incorporated; Title: E-TFC Selection in UE for DC-HSUPA (R4-100208)—Jan. 18-22, 2010.

* cited by examiner

SYSTEMS AND METHODS FOR POWER ALLOCATION IN UPLINK MULTICARRIER SCENARIOS FOR MIXED TRANSMISSION TIME INTERVALS

PRIORITY

This nonprovisional application is a U.S. National Stage Filing under 35 U.S.C. § 371 of International Patent Application Serial No. PCT/EP2017/074896 filed Sep. 29, 2017 and entitled "Systems and Methods For Power Allocation in Uplink Multicarrier Scenarios For Mixed Transmission Time Intervals" which claims priority to U.S. Provisional Patent Application No. 62/402,276 filed Sep. 30, 2016 both of which are hereby incorporated by reference in their entirety.

TECHNICAL FIELD

The present disclosure relates, in general, to wireless communications and, more particularly, systems and methods for power allocation in uplink multicarrier scenarios for mixed transmission time intervals.

BACKGROUND

In Rel-9, the Universal Mobile Telecommunications System (UMTS) standard introduced Dual-Carrier HSUPA (DC-HSUPA), which aims to increase the uplink data throughput by allowing a wireless device to transmit on two uplink carriers at the same time. In Rel-13, Dual-band Dual-Carrier HSUPA (DB-DC HSUPA) was added to the standard. DB-DC HSUPA aims at configuring two uplink carriers on different frequency bands. However, when DB-DC HSUPA is configured, high-frequency carriers have smaller coverage relative to low-frequency carriers. For example, there is a coverage difference of approximately 7.3 dB between a carrier operating at 900 MHz and a carrier operating at 2.1 GHz.

Until recently, the UMTS standard allowed configuration of a Transmission Time Interval (TTI) equal to 2 ms or 10 ms in the case of single carrier HSUPA. However, the UMTS standard only allows for configuring a TTI equal to 2 ms on both carriers for DB-DC HSUPA and/or DC-HSUPA. Nonetheless, and continuing with the evolution of the UMTS standard, a recently approved Rel-14 Work Item entitled "Multicarrier Enhancements for UMTS" will open the possibility of configuring 10 ms TTI on one or both uplink carrier frequencies in DB-DC HSUPA and/or DC-HSUPA scenarios.

Enabling different TTI configuration per carrier in DB-DC HSUPA and/or DC-HSUPA opens the possibility of having a variety of scenarios. For example, since 10 ms TTI offers a better coverage than 2 ms TTI, then in DB-DC HSUPA 10 ms TTI may be configured on a high frequency band and 2 ms TTI on the low frequency band. Such a configuration may provide compensation, even if slight, for the different propagation properties associated with each band. At a given path loss ratio, the compensation given by the TTI, if any, may be only approximately 1 dB or 2 dB, while the coverage difference between 900 MHz band and 2.1 GHz band may be approximately 7.3 dB.

The mixed TTI configuration for Uplink (UL) Multicarrier may have some side effects on some procedures and/or functionalities that currently only account for uplink transmissions to be performed on a 2 ms TTI basis. For example, prior to Rel-14, the standard stated that the power allocation in UL Multicarrier must be performed at the TTI boundary. As used herein, the term TTI boundary refers to the start of a TTI. However, it may be recognized that, upon the completion of Rel-14, the uplink carrier frequencies may be configured with different TTI boundaries. In that case, there will be two different TTI boundaries making power allocation problematic in those scenarios.

The Rel-14 "Multicarrier enhancements for UMTS" may also require a revision of some existing procedures and/or functionalities.

SUMMARY

To address the foregoing problems with existing solutions, disclosed are systems and methods for power allocation in uplink multicarrier scenarios for mixed transmission time intervals.

According to certain embodiments, a method by a wireless device for handling power allocation during a multicarrier operation having a mixed transmission time interval (TTI) configuration, wherein a first TTI configured on a first frequency is configured with a shorter length than a second TTI configured on a second frequency, the method comprising: determining a power allocation for a scheduled data transmission carried over the first frequency when the first TTI and the second TTI are not at a common TTI boundary, wherein determining the power allocation is based on a remaining power for scheduled transmissions based on a maximum transmitter power of the wireless device, less any power for non-scheduled transmissions and a reserved power for any scheduled data transmission on the second frequency based on a filtered power of a dedicated physical control channel, DPCCH, and a power offset for an enhanced-transport format combination, E-TFC, of a transmission for the second frequency configured with the second TTI, wherein the filtered power is averaged over a number of slots having a total duration equal to the second TTI length. This provides the advantage that the power allocation for the first frequency takes into account the power allocation for the second frequency when the second frequency is not at the common TTI boundary with the first frequency. Thus a more accurate power allocation is determined.

In a further example of the above embodiment the power allocation for the scheduled data transmission on the first frequency is determined as:

$$P_{remaining,s} = \max(P\text{Max} - \Sigma_i P_{DPCCH,target,i} - P_{HS-DPCCH} - P_{DPDCH} - P_{non-SG} - P_k, 0).$$

In the above example PMax represents the maximum transmitter power of the wireless device; $P_{DPCCH,target,i}$ represents the filtered power of the DPCCH for a carrier with an index, i, at a time, t, wherein index i has values corresponding to both the first frequency and the second frequency. $P_{HS-DPCCH}$ represents a power of a High-Speed Dedicated Physical Control Channel (HS-DPCCH) based on the $P_{DPCCH,target,i}$ of a particular one of the first frequency or the second frequency on which the HS-DPCCH is configured and the power offset. $P_{DPDCH}$ represents a power of a Dedicated Physical Data Channel (DPDCH) based on the $P_{DPCCH,target,i}$ of a particular one of the first frequency or the second frequency on which the DPDCH is configured and the power offset. $P_{non-SG}$ represents a power for any non-scheduled E-DCH data transmissions based on the $P_{DPCCH,target,i}$ of a particular one of the first frequency and the second frequency on which the non-scheduled E-DCH data transmissions are configured and the power offset. $P_k$ represents the reserved power for the scheduled data transmissions on the second frequency based on the filtered power of the DPCCH and the power offset, which is the power offset for an the enhanced-transport format combination, E-TFC, of a the scheduled data transmission for the second frequency.

According to certain embodiments a method for determining a power allocation for both the first frequency and the second frequency when the first TTI and second TTI are at a common boundary is provided. Wherein a total available power is based on the remaining power for the system wherein the remaining power for the system is based on a filtered power of a dedicated physical control channel, DPCCH, for each of the first frequency and the second frequency, wherein the filtered power is filtered over a number of slots having a total duration equal to a TTI length for a particular one of the first frequency and the second frequency and a respective scheduled grant for the particular one of the first frequency and the second frequency as a proportion of a total power reserved for the other one of the first and second frequency.

According to certain embodiments, a wireless device for handling power allocation during a multicarrier operation having a mixed transmission time interval (TTI) configuration, wherein a first TTI configured on a first frequency is configured with a shorter length than a second TTI configured on a second frequency, the method comprising: a processor operable to execute the instructions to cause the wireless device to determine a power allocation for a scheduled data transmission carried over the first frequency when the first TTI and the second TTI are not at a common TTI boundary, wherein determining the power allocation is based on a remaining power for scheduled transmissions derived from a maximum transmitter power of the wireless device, less any power for non-scheduled transmissions and a reserved power for any scheduled data transmission on the second frequency derived from a filtered power of a dedicated physical control channel, DPCCH, and a power offset for an enhanced-transport format combination, E-TFC, of a transmission for the second frequency configured with the second TTI, wherein the filtered power is averaged over a number of slots having a total duration equal to the second TTI length.

In a further example of the above embodiment the power allocation for the scheduled data transmission on the first frequency is determined as:

$$P_{remaining,s} = \max(PMax - \Sigma_i P_{DPCCH,target,i} - P_{HS-DPCCH} - P_{DPDCH} - P_{non-SG} - P_k, 0).$$

According to certain embodiments a computer program or storage medium is disclosed wherein the computer program comprises instructions capable of being executed on a processor and the storage medium contains instructions capable of being executed on a processor which, when executed on a processor, perform any one of the methods of claims 1 to 10.

Certain embodiments of the present disclosure may provide one or more technical advantages. For example, certain embodiments may resolve the issue of not knowing at which the TTI boundary the power allocation should be performed for DB-DC HSUPA and DC-HSUPA scenarios that are configured with different TTIs on the uplink carrier frequencies. Another advantage may be that the existing power allocation procedure, which was originally developed for handling a 2 ms TTI case only, is made compatible with the scenario where DB-DC HSUPA or DC-HSUPA is configured with 10 ms TTI on both uplink carrier frequencies, or when DB-DC HSUPA or DC-HSUPA is used in scenarios with a mixed TTI configuration. Still another advantage may be that the techniques provided indicate to higher layers the proper estimate of the remaining power that can be used for performing scheduled E-DCH transmissions when DB-DC HSUPA and DC-HSUPA deals with the same or different TTIs configured on the uplink carrier frequencies. Still another advantage may be that the issue of not knowing how the filtering of the DPCCH power should be performed when DB-DC HSUPA or DC-HSUPA is configured with different TTIs on the uplink carrier frequencies is resolved. Further, another technical advantage may be that the systems and methods provides an estimate on how much power should be reserved for the HS-DPCCH channel which is transmitted on a 2 ms TTI basis, when DB-DC HSUPA or DC-HSUPA is configured with 10 ms TTI on both uplink carrier frequencies.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
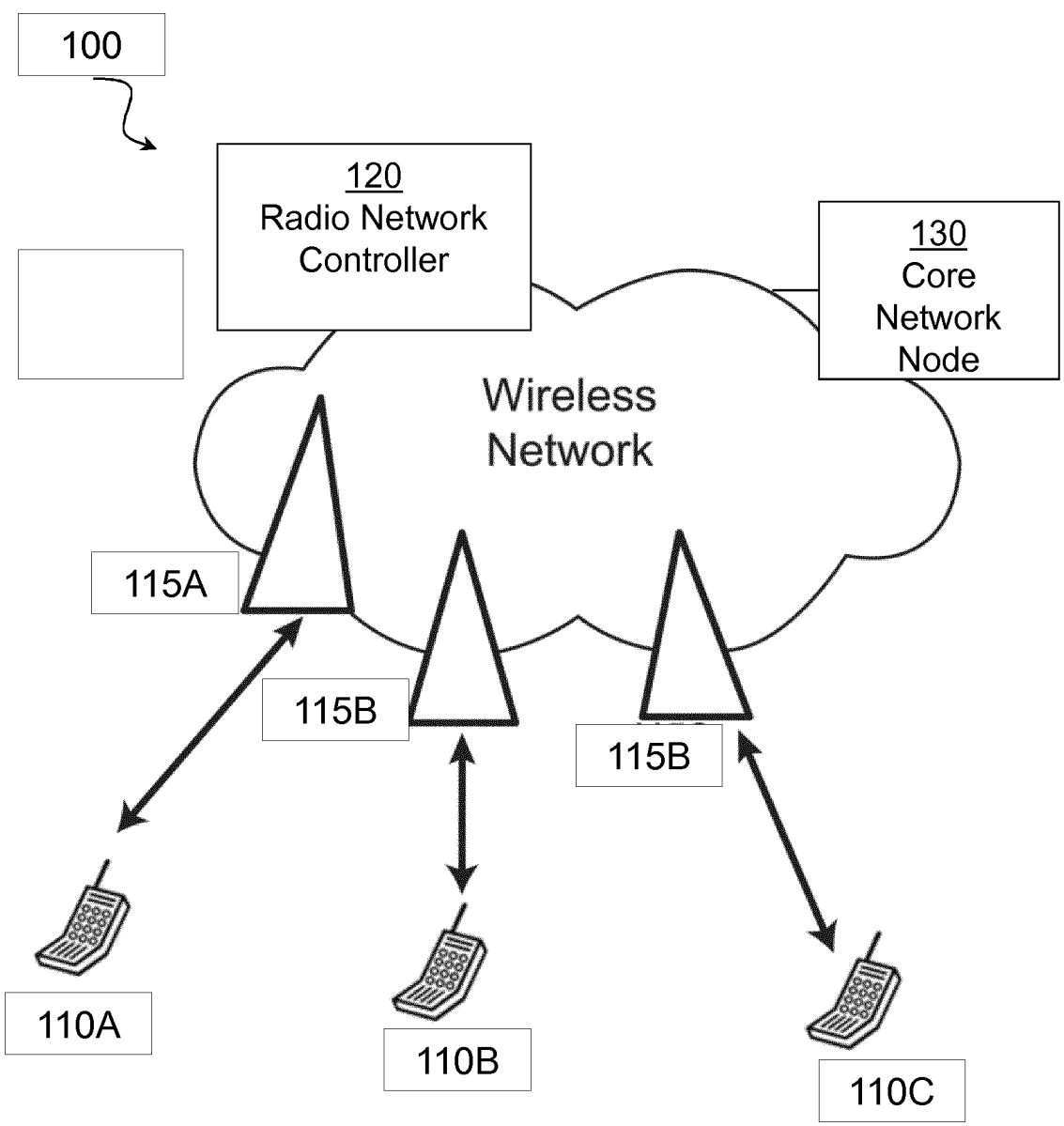
FIG. 1 illustrates an exemplary network for handling power allocation in uplink (UL) multicarrier scenarios for mixed transmission time intervals (TTIs), in accordance with certain embodiments.

The existing 3GPP procedures and functionalities for DB-DC HSUPA and/or DC-HSUPA were made to handle uplink transmissions performed on a 2 ms TTI basis only. Thus, when 10 ms TTI becomes available for future implementations and scenarios of DB-DC HSUPA and/or DC-HSUPA, certain consequences may be observed. For example, prior to Rel-14, the power allocation for DB-DC HSUPA and/or DC-HSUPA must be performed at the TTI boundary, particularly 2 ms TTI for both carriers. However, upon the completion of Rel-14 the uplink carrier frequencies may be configured with different TTIs. For example, 2 ms for one carrier and 10 ms for another carrier. In that case, there may be two different TTI boundaries making it unclear how the power allocation should be handled in those scenarios.

Another consequence may be that the power allocation makes use of a filtered version of the power used on the Dedicated Physical Control Channel (DPCCH). When 10 ms TTI is used in single carrier operation, the filtering is performed over 15 slots. Conversely, when 2 ms TTI is used in single carrier operation, the filtering has to be performed over 3 slots. Now that DB-DC HSUPA and/or DC-HSUPA may be configured with different TTIs per carrier, it is unclear over how many slots the filtering should be performed when the power allocation invokes the filtered version of DPCCH at a TTI boundary which is not common to the other TTI boundaries of a multicarrier scenario.

Still another consequence may be that where the UL carrier frequencies are configured both with a 10 ms TTI, it is unclear how the existing power allocation formula accounts for the power to be used on the HS-DPCCH channel, which is transmitted on a 2 ms TTI basis.

Disclosed are systems and methods for power allocation in UL multicarrier scenarios for mixed TTIs. In particular embodiments, the systems and methods address how power allocation may be handled after a 10 ms TTI configuration is incorporated as part of a DB-DC HSUPA and/or DC-HSUPA scenario.

According to certain embodiments, a method for handling the power allocation of DB-DC HSUPA and/or DC-HSUPA including 10 ms TTI and/or Mixed TTI configurations is provided that includes:

When the configured TTIs on the UL carrier frequencies are at a common TTI boundary (this encompassed not only a mixed TTI configuration, but also 2 ms+2 ms and 10 ms+10 ms, i.e the TTI of the first frequency and the TTI of the second frequency are the same), the power allocation should be performed as it is done prior Rel-14.

On the other hand, when the configured TTIs on the UL carrier frequencies are not at a common TTI boundary (this refers to the mixed TTI configuration only, including 2 ms+10 ms and 10 ms+2 ms, here the values represent the TTI of the first frequency=2 ms and the TTI of the second frequency=10 ms or the TTI of the first frequency=10 ms and the TTI of the second frequency=2 ms), the power allocation for the carrier configured with 2 ms TTI is updated at its 'not common' TTI boundary, i.e. when its TTI boundary is not the common TTI boundary with the 10 ms TTI, accounting for a reserved power associated to the carrier transmitting on a 10 ms TTI basis which is updated only at common TTI boundaries. Stated differently, the carrier configured with 2 ms TTI is updated at every three slots (i.e., at the TTI boundary on that carrier) even when such a boundary does not coincide with the boundary of the carrier configured with 10 ms TTI.

According to certain embodiments, a method for knowing over how many slots the DPCCH power should be filtered when DB-DC HSUPA and/or DC-HSUPA is configured with different TTIs on the UL carrier frequencies is provided, which may include any of the following solutions:

One alternative consists in always performing the filtering of the DPCCH power to provide a 3 slots (i.e., one subframe) average regardless of the TTI length configuration of the uplink carrier frequencies.

A second alternative consists of reusing the way the DPCCH power is filtered in single carrier scenarios, where for a 10 ms TTI configuration the DPCCH power is filtered to provide a 15 slots average, while for a 2 ms TTI configuration the DPCCH power is filtered to provide a 3 slots average. This can be done under the assumption that the filtered samples of the DPCCH power on the 10 ms TTI carrier are available to be used for power allocation purposes at the 'not common' TTI boundaries of the 2 ms TTI case (i.e. when its TTI boundary is not a common TTI boundary with the 10 ms TTI). Further, this can be done since the filtered samples of the DPCCH power on the 10 ms TTI carrier are available on every slot (the rate at which power control updates occur) and so a running filter (such as 15 slot running average) can be used for power allocation purposes at the 'not common' TTI boundaries of the 2 ms TTI case (i.e. when its TTI boundary is not a common TTI boundary with the 10 ms TTI).

According to certain embodiments, a method for reserving the power for the HS-DPCCH prior to the power allocation when DB-DC HSUPA and/or DC-HSUPA is configured with 10 ms TTI on both uplink carrier frequencies is provided, which may include any of the following solutions:

The power that is reserved for the HS-DPCCH transmission at the moment of estimating the remaining power for scheduled E-DCH transmissions could be derived as the maximum expected activity level of the HS-DPCCH, the power offset of the HS-DPCCH, and the DPCCH power. For example, the activity level of the HS-DPCCH could be given by both the occurrence of the ACK/NACK transmissions, and the CQI estimates which are periodically reported to the network.

The power that is reserved for the HS-DPCCH transmissions at the moment of estimating the remaining power for scheduled E-DCH transmissions, could be derived as the average activity level of the HS-DPCCH transmissions obtained from filtering (either or both) the ACK/NACK and CQI transmissions, the power offset of the HS-DPCCH, and the UL DPCCH power.

Particular embodiments are described in FIGS. 1-9 of the drawings, like numerals being used for like and corresponding parts of the various drawings. FIG. 1 is a block diagram illustrating an embodiment of a network 100 for handling power allocation in UL multicarrier scenarios for mixed TTIs, in accordance with certain embodiments. Network 100 includes one or more radio nodes that may communicate via network 100. Radio nodes may include one or more wireless devices 110A-C, which may be interchangeably referred to as wireless devices 110 or UEs 110, and network nodes 115A-C, which may be interchangeably referred to as network nodes 115 or eNodeBs 115, radio network controller 120, and a core network node 130. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller 120. Radio network controller 120 may control network nodes 115 and may provide certain radio resource management functions, mobility management functions, and/or other suitable functions. In certain embodiments, radio network controller 120 may interface with core network node 130 via an interconnecting network 125. The interconnecting network 125 may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 130 may manage the establishment of communication sessions and provide various other functionality for wireless communication device 110. Wireless communication device 110 exchanges certain signals with core network node 130 using the non-access stratum layer. In non-access stratum (NAS) signaling, signals between wireless communication device 110 and core network node 130 pass transparently through network nodes 120.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Each of wireless communication device 110, network node 115, radio network controller 120, and core network node 130 include any suitable combination of hardware and/or software. Example embodiments of network nodes 115, wireless devices 110, and other network nodes (such as radio network controller or core network node) are described in more detail with respect to FIGS. 2, 3, and 9, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). In certain embodiments, wireless communication device 110, network node 120, and core network node 130 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies.

Figure 2:
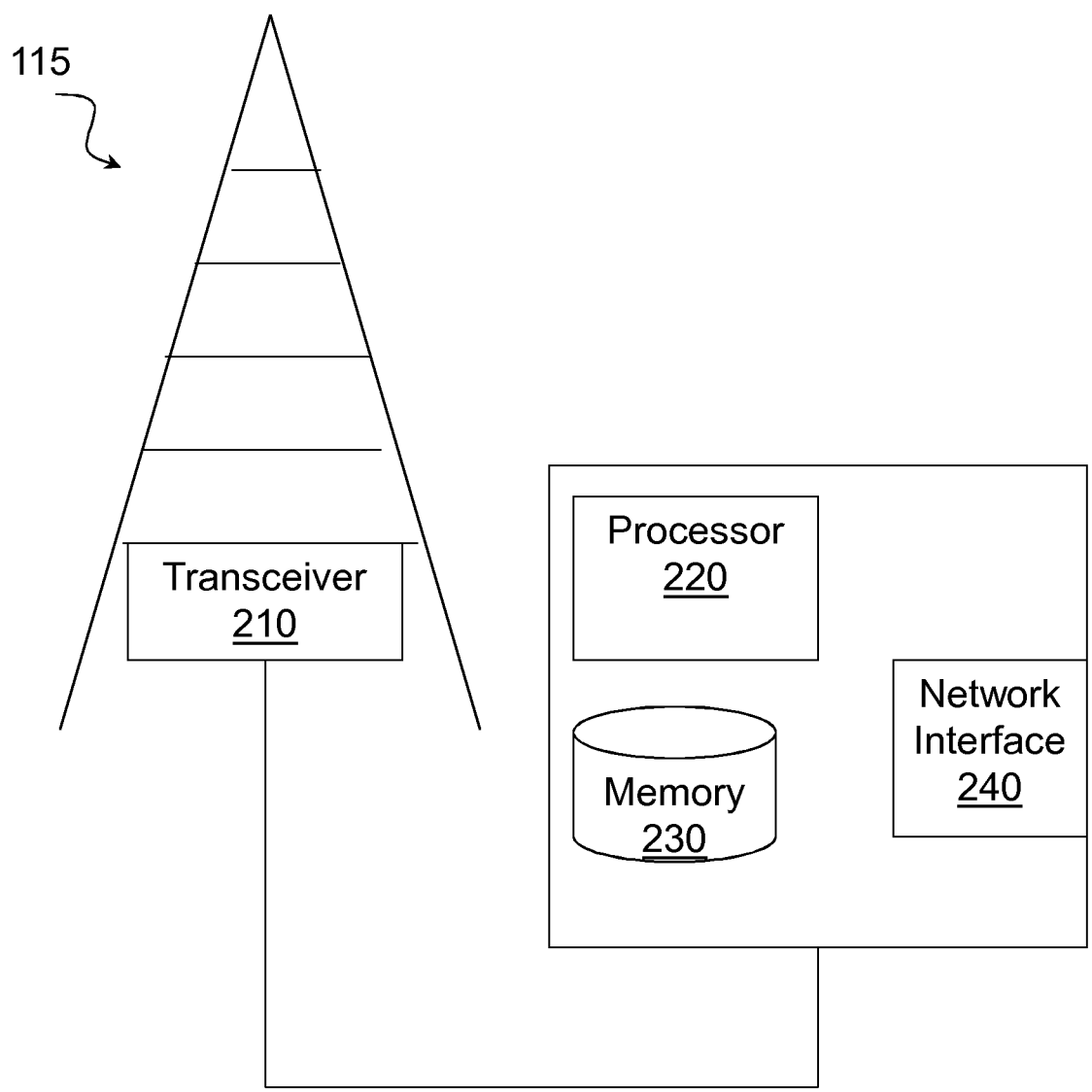
FIG. 2 illustrate an exemplary network node for handling power allocation in UL multicarrier scenarios for mixed TTIs, in accordance with certain embodiments.

FIG. 2 illustrate an example network node 115 for handling power allocation in UL multicarrier scenarios for mixed TTIs, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processor 220, memory 230, and network interface 240. In some embodiments, transceiver 210 facilitates transmitting wireless signals to and receiving wireless signals from wireless device 110 (e.g., via an antenna), processor 220 executes instructions to provide some or all of the functionality described above as being provided by a network node 115, memory 230 stores the instructions executed by processor 220, and network interface 240 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 220 may include any suitable combination of hardware and software implemented in one or more modules to execute instructions and manipulate data to perform some or all of the described functions of network node 115. In some embodiments, processor 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 240 is communicatively coupled to processor 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 2 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 3:
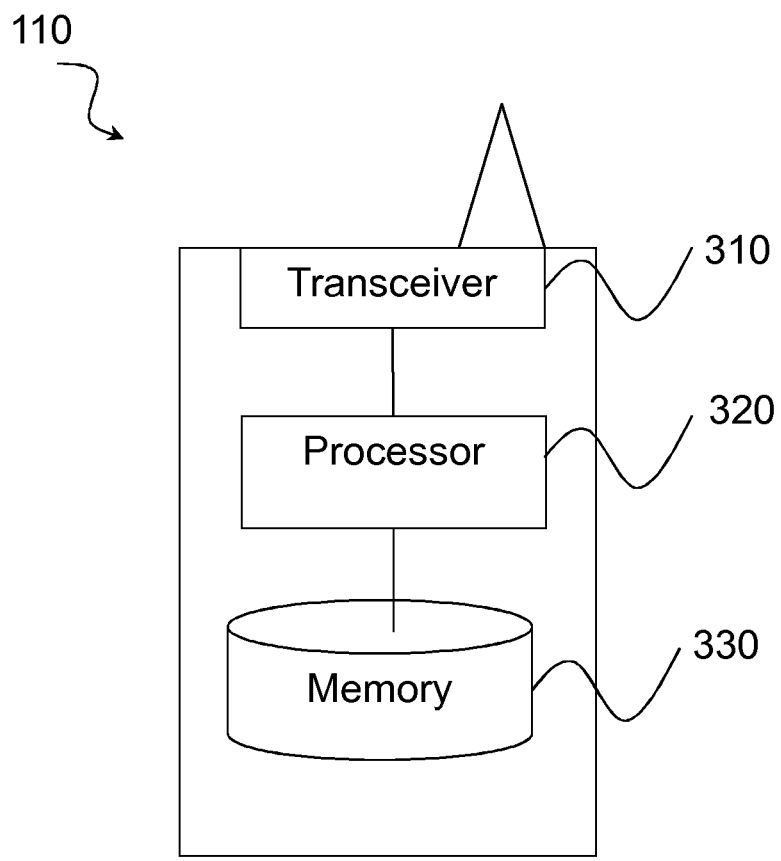
FIG. 3 illustrates an exemplary wireless device for handling power allocation in UL multicarrier scenarios for mixed TTIs, in accordance with certain embodiments.

FIG. 3 illustrates an example wireless device 110 for power allocation in uplink multicarrier scenarios for mixed transmission time intervals, in accordance with certain embodiments. As depicted, wireless device 110 includes transceiver 310, processor 320, and memory 330. In some embodiments, transceiver 310 facilitates transmitting wireless signals to and receiving wireless signals from network node 115 (e.g., via an antenna), processor 320 executes instructions to provide some or all of the functionality described above as being provided by wireless device 110, and memory 330 stores the instructions executed by processor 320. Examples of a wireless device 110 are provided above.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Processor 320 may include any suitable combination of hardware and software implemented in one or more modules to execute instructions and manipulate data to perform some or all of the described functions of wireless device 110. In some embodiments, processor 320 may include, for example, one or more computers, one or more central processing units (CPUs), one or more microprocessors, one or more applications, processing circuitry, and/or logic.

According to particular embodiments, processor 320 may be configured to handle power allocation in uplink multi-carrier scenarios for mixed transmission time intervals. For example processor 320 may be operable to execute the instructions to cause the wireless device to determine a power allocation for a scheduled data transmission carried over the first frequency when the first TTI and the second TTI are not at a common TTI boundary. Specifically, the power allocation may be determined based on a remaining power for scheduled transmissions derived from a maximum transmitter power of the wireless device, less any power for non-scheduled transmissions and a reserved power for any scheduled data transmission on the second frequency derived from a filtered power of a dedicated physical control channel, DPCCH, and a power offset for an enhanced-transport format combination, E-TFC, of a transmission for the second frequency configured with the second TTI. The filtered power may be averaged over a number of slots having a total duration equal to the second TTI length.

In a particular embodiment, for example, processor 320 may determine the remaining power on which the power allocation for the scheduled data transmission on the first frequency as:

$$P_{remaining,s} = \max(PMax - \Sigma_i P_{DPCCH,target,i} - P_{HS-DPCCH} - P_{DPDCH} - P_{non-SG} - P_k, 0);$$

where,

PMax represents the maximum transmitter power of the wireless device, $P_{DPCCH,target,i}$ represents the filtered power of the DPCCH for a carrier with an index, i, at a time, t, wherein index i has values corresponding to both the first frequency and the second frequency;

$P_{HS-DPCCH}$ represents a power of a High-Speed Dedicated Physical Control Channel (HS-DPCCH) based on the $P_{DPCCH,target,i}$ of a particular one of the first frequency or the second frequency on which the HS-DPCCH is configured and the power offset;

$P_{DPDCH}$ represents a power of a Dedicated Physical Data Channel (DPDCH) based on the $P_{DPCCH,target,i}$ of a particular one of the first frequency or the second frequency on which the DPDCH is configured and the power offset;

wherein $P_{non-SG}$ represents a power for any non-scheduled E-DCH data transmissions based on the $P_{DPCCH,target,i}$ of a particular one of the first frequency and the second frequency on which the non-scheduled E-DCH data transmissions are configured and the power offset, and wherein $P_k$ represents the reserved power for the scheduled data transmissions on the second frequency based on the filtered power of the DPCCH and the power offset for an the enhanced-transport format combination, E-TFC, of a the scheduled data transmission for the second frequency.

According to particular embodiments, processor 320 may determine the filtered power by averaging the power per slot over the number of slots equal to a respective TTI length. For example, if the first TTI configured on the first frequency is 2 ms, the power may be averaged over 3 slots. If the second TII configured on the second frequency is 10 ms, the power may be averaged over 15 slots.

According to particular embodiments, processor 320 may be also be configured to execute the instructions to cause the wireless device 110 to determine a power allocation for both the first frequency and the second frequency when the first TTI and second TTI are at a common boundary wherein a total available power is based on the remaining power for the system wherein the remaining power for the system is based on a filtered power of a dedicated physical control channel, DPCCH, for each of the first frequency and the second frequency, wherein the filtered power is filtered over a number of slots having a total duration equal to a TTI length for a particular one of the first frequency and the second frequency and a respective scheduled grant for the particular one of the first frequency and the second frequency as a proportion of a total power reserved for the other one of the first and second frequency.

In a particular embodiment, for example, processor 320 may determine the power as:

$$P_i = P_{remaining,s} \frac{P_{DPCCH,target,i} SG_i}{\sum_k P_{DPCCH,target,k} SG_k};$$

where, $P_{remaining,s}$, for the scheduled data transmission is determined as:

$P_{remaining,s} = \max(PMax - \Sigma_i P_{DPCCH,target,i} - P_{HS-DPCCH} - P_{DPDCH} - P_{non-SG}, 0);$ PMax represents the maximum transmitter power of the wireless device;

$P_{DPCCH,target,i}$ represents the filtered power of the DPCCH for a carrier with an index, i, at a time, t, wherein index i has values corresponding to both the first frequency and the second frequency;

$P_{HS-DPCCH}$ represents a power of a High-Speed Dedicated Physical Control Channel (HS-DPCCH) based on the $P_{DPCCH,target,i}$ of a particular one of the first frequency or the second frequency on which the HS-DPCCH is configured and the power offset;

$P_{DPDCH}$ represents a power of a Dedicated Physical Data Channel (DPDCH) based on the $P_{DPCCH,target,i}$ of a particular one of the first frequency or the second frequency on which the DPDCH is configured and the power offset; and $P_{non-SG}$ represents a power for any non-scheduled E-DCH data transmissions based on the $P_{DPCCH,target,i}$ of a particular one of the first frequency or the second frequency on which the non-scheduled E-DCH data transmissions are configured and the power offset.

Other embodiments of wireless device 110 may include additional components beyond those shown in FIG. 3 that may be responsible for providing certain aspects of the wireless device's functionality, including any of the functionality described above and/or any additional functionality (including any functionality necessary to support the solution described above).

Prior to Rel-14, DB-DC HSUPA and/or DC-HSUPA could only be configured with 2 ms TTI on both carriers. Nonetheless, the Rel-14 WI on "Multicarrier Enhancements for UMTS" may open the possibility of configuring a 10 ms TTI in one or both uplink carrier frequencies. This new versatility added to UL Multicarrier will lead to have some side effects on procedures and functionalities that were originally built for the handling only a 2 ms TTI configuration in DB-DC HSUPA and/or DC-HSUPA scenarios.

This is the case of the power allocation procedure for UL Multicarrier, which according to the UMTS standard is calculated based on the DPCCH quality and serving grant for each carrier. More specifically, the power allocation $P_i$ to a frequency i for scheduled data transmission, is calculated provided in 3GPP TS 25.321: "MAC protocol specification", version 13.2.0, Rel-13:

$$P_i = P_{remaining,s} \frac{P_{DPCCH,target,i} SG_i}{\sum_k P_{DPCCH,target,k} SG_k} \quad (1)$$

Where $P_{remaining,s}$ is the remaining power for scheduled transmissions once the power for non-scheduled transmissions has been taken into account, $P_{DPCCH,target,i}$ is the filtered DPCCH power defined in 3GPP TS 25.133, "Requirements for support of radio resource management", version 14.0.0, Rel-14, and $SG_i$ is the Serving Grant on frequency i.

The UMTS standard also provides an exact definition for $P_{remaining,s}$, which is defined in 3GPP TS 25.133, "Requirements for support of radio resource management", version 14.0.0, Rel-14 as follows:

When the UE has more than one Activated Uplink Frequency, the UE shall estimate the remaining power which is available to be allocated to scheduled E-DCH transmissions on all Activated Uplink Frequencies. The total available power for scheduled E-DCH transmissions is defined by:

$P_{remaining,s} = \max(PMax - \Sigma_i P_{DPCCH,target,i} - P_{HS-DPCCH} - P_{DPDCH} - P_{non-SG}, 0);$ Where:

PMax represents the Maximum UE Transmitter power, as defined in Section 6.5 in 3GPP TS 25.101, "User Equipment (UE) radio transmission and reception (FDD)", version 14.0.0, Rel-14.

$P_{DPCCH,i}(t)$ represents a slotwise estimate of the current UE DPCCH power for carrier with index i (i=0,1) at time t. If at time t, the UE is transmitting a compressed mode frame then $P_{DPCCH,comp,i}(t) = P_{DPCCH,i}(t) \times (N_{pilot,C}/N_{pilot,N})$ else $P_{DPCCH,comp,i}(t) = P_{DPCCH,i}(t)$. If the UE is not transmitting uplink DPCCH on the Activated Uplink Frequency i during the slot at time t, either due to compressed mode gaps or when discontinuous uplink DPCCH transmission operation is enabled then the power shall not contribute to the filtered result. Samples of $P_{DPCCH,comp,i}(t)$ shall be filtered using a filter period of 3 slotwise estimates of $P_{DPCCH,comp,i}(t)$. The accuracy of the $P_{DPCCH,i}$ estimate shall be at least that specified in table 6.0A in 3GPP TS 25.133, "Requirements for support of radio resource management", version 14.0.0, Rel-14.

If the target E-DCH TTI for which the remaining power margin (RPM) is being evaluated does not correspond to a compressed mode frame then $P_{DPCCH,target,i} = P_{DPCCH,filtered,i}$.

If the target E-DCH TTI for which RPM is being evaluated corresponds to a compressed mode frame then $P_{DPCCH,target,i} = P_{DPCCH,filtered,i} \times (N_{pilot,N}/N_{pilot,C})$.

$N_{pilot,N}$ and $N_{pilot,C}$ are numbers of pilot symbols as defined in 3GPP TS 25.214: "Physical layer procedures (FDD)", version 13.3.1, Rel-13.

$P_{HS-DPCCH}$ represents the estimated HS-DPCCH transmit power and shall be calculated based on the estimated Primary Activated Frequency DPCCH power, and the greatest HS-DPCCH gain factor. If two HS-DPCCHs are transmitted, $P_{HS-DPCCH}$ is the maximum combined estimated transmit power from both HS-DPCCHs. Rules for calculating the HS-DPCCH gain factors from the most recent signalled $\Delta_{ACK}$, $\Delta_{NACK}$ and $\Delta_{CQI}$ according to the specific multicarrier and MIMO configuration and activation status of the secondary HS-DSCH serving cells are defined in subclause 5.1.2.5A in 3GPP TS 25.214: "Physical layer procedures (FDD)", version 13.3.1, Rel-13.

$P_{DPDCH}$ represents estimated DPDCH transmit power on Primary Activated Frequency based on $P_{DPDCH,target}$ and the gain factors from the TFC selection that has already been made. If the target E-DCH TTI for which the normalized NRM for E-TFC candidate j (NRPMj) is being evaluated corresponds to a compressed mode frame then the modification to the gain factors which occur due to compressed mode shall be included in the estimate of $P_{DPDCH}$.

$P_{non-SG}$ represents the power pre-allocated for non-scheduled transmissions for Primary Uplink Frequency, as defined by 3GPP TS 25.331, "Radio Resource Control (RRC)", version 13.3.0, Rel-13. An estimate of the E-DPCCH power required for non-scheduled transmissions may be included in $P_{non-SG}$.

As used herein, the term based on may be used interchangeably with the terms derived from and by using. As just one example, it is disclosed above that $P_{HS-DPCCH}$ represents the estimated HS-DPCCH transmit power and shall be calculated based on the estimated Primary Activated Frequency DPCCH power, and the greatest HS-DPCCH gain factor. As such, the $P_{HS-DPCCH}$ may also be said to be calculated by using the estimated Primary Activated Frequency DPCCH power, and the greatest HS-DPCCH gain factor. Likewise, the $P_{HS-DPCCH}$ may also be said to be derived from the estimated Primary Activated Frequency DPCCH power, and the greatest HS-DPCCH gain factor.

Figure 4:
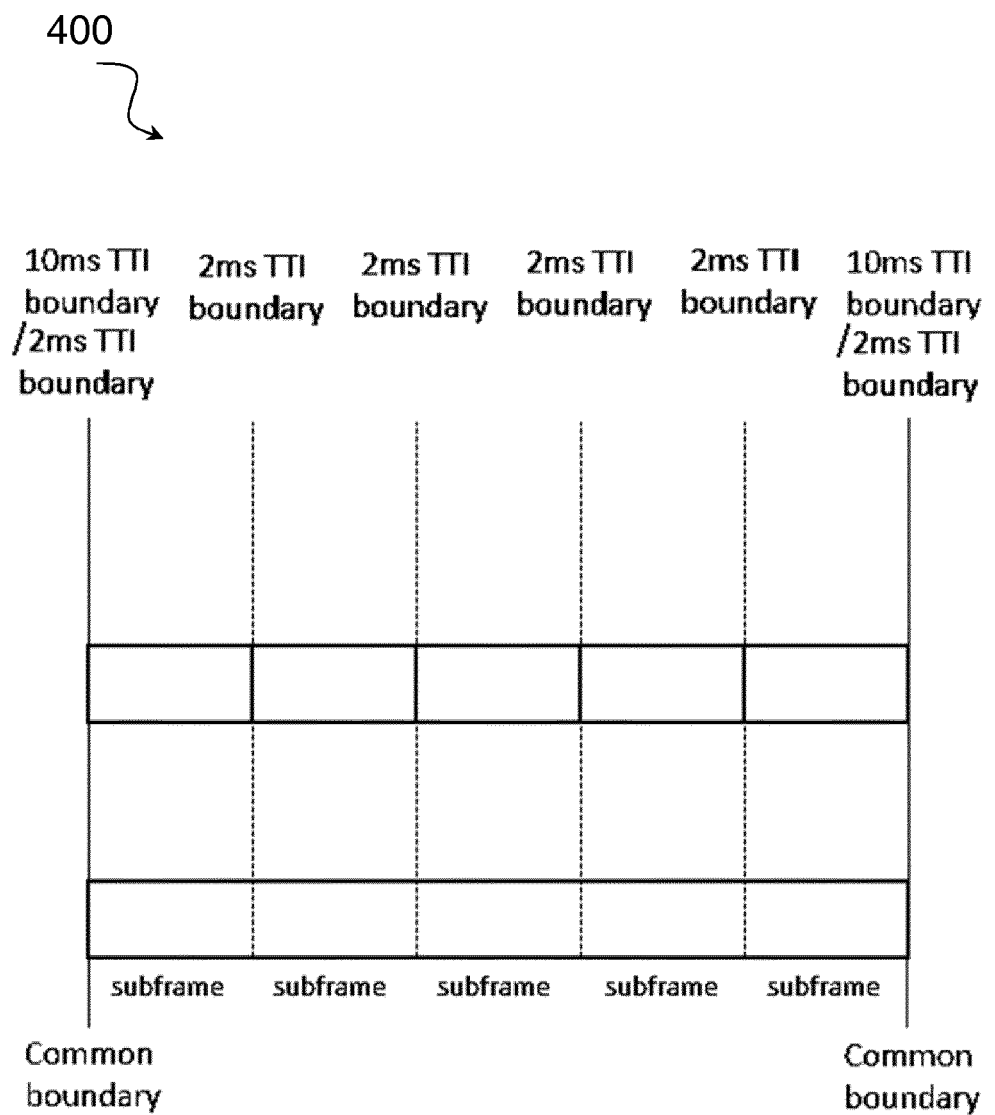
FIG. 4 illustrates exemplary TTI boundaries for 2 ms and 10 ms TTI configurations, in accordance with certain embodiments.

Additionally, the term TTI boundary refers to the start of a TTI. According to previous techniques, the power allocation procedure is performed at each TTI boundary. Thus, for 2 ms TTI, the power allocation procedure is performed at the beginning of each 2 ms TTI. For a dual-carrier scenario where both TTIs are configured for 2 ms, the boundaries for both carriers align and the power allocation procedure for each carrier is again performed at the beginning of each 2 ms TTI. However, upon the completion of Rel-14, which will allow 10 ms TTI configurations, different TTI boundaries may coexist since it will possible to configure a 10 ms TTI in one or both uplink carrier frequencies. FIG. 4 illustrates TTI boundaries for 2 ms TTI, and 10 ms TTI, according to certain embodiments.

Since different TTI configurations may coexist, the power allocation procedure has to be revised in order to make the standard compatible with the new DB-DC HSUPA and/or DC-HSUPA scenarios that will be available after the 3GPP Rel-14 is completed.

In certain embodiments, for handling the power allocation of DB-DC HSUPA and/or DC-HSUPA including 10 ms TTI and Mixed TTI configurations, the following power allocation techniques may be performed:

When the TTIs configured on the uplink carrier frequencies are at a common TTI boundary, the power allocation to a frequency i, $P_i$, is calculated as:

$$P_i = P_{remaining,s} = \frac{P_{DPCCH,target,i} SG_i}{\Sigma_k P_{DPCCH,target,k} SG_k}$$

where $P_{remaining,s}$ is the remaining power for scheduled transmissions once the power for non-scheduled transmissions has been taken into account, $P_{DPCCH,target,i}$ is the filtered DPCCH power defined in [12], and $SG_i$ is the Serving Grant on frequency i.

When the TTIs configured on the uplink carrier frequencies are not at a common TTI boundary, the power allocation for the uplink carrier frequency i, $P_i$, configured with 2 ms TTI is calculated as:

$$P_i = P_{remaining,s}$$

where $P_{remaining,s}$ is the remaining power for scheduled transmissions once the power for non-scheduled transmissions has been taken into account.

If the TTIs configured on the uplink carrier frequencies are at a common TTI boundary, the total available power for scheduled E-DCH transmissions is defined by:

$$P_{remaining,s} = \max(PMax - \Sigma_i P_{DPCCH,target,i} - P_{HS-DPCCH} - P_{DPDCH} - P_{non-SG}, 0)$$

If the TTIs configured on the uplink carrier frequencies are not at a common TTI boundary and Activated Uplink Frequency k is configured with 10 ms TTI, the total available power for scheduled E-DCH transmissions is defined by:

$$P_{remaining,s} = \max(PMax - \Sigma_i P_{DPCCH,target,i} - P_{HS-DPCCH} - P_{DPDCH} - P_{non-SG} - P_k, 0)$$

The power $P_k$ may be taken to be the power that was determined in the last power allocation for carrier k. Alternatively, it can be more accurately estimated based on or by using the current filtered power of the DPCCH and the power offset for the E-TFC of the transmission for the carrier k.

The above means that when the configured TTIs on the uplink carrier frequencies are at a common TTI boundary (this encompassed not only a mixed TTI configuration, but also 2 ms+2 ms and 10 ms+10 ms), the power allocation should be performed as it is done prior to Rel-14.

On the other hand, when the configured TTIs on the uplink carrier frequencies are not at a common TTI boundary (this refers to the mixed TTI configuration only, including 2 ms+10 ms and 10 ms+2 ms, including 2 ms+10 ms and 10 ms+2 ms), the power allocation for the carrier configured with 2 ms TTI is updated at its TTI boundary, which is not common to the TTI boundary of the other TTI/frequency, thus, must account for a reserved power associated to the carrier transmitting on a 10 ms TTI basis which is updated only at common TTI boundaries.

According to certain embodiments, methods for determining how many slots the DPCCH power should be filtered when DB-DC HSUPA and/or DC-HSUPA is configured with different TTIs on the uplink carrier frequencies, may include any of the following solutions can be applied:

According to a particular embodiment, the method includes always performing the filtering of the DPCCH power over 3 slots (i.e., one subframe) regardless of the TTI configuration of the uplink carrier frequencies. In this case, the text in the standard can be revised as follows:

Samples of $P_{DPCCH,comp,i}(t)$ shall be filtered using a filter with a 3 slot estimates of $P_{DPCCH,comp,i}(t)$ regardless of the TTI configuration on the uplink carrier frequencies.

According to a particular embodiment, the method may include reusing the way the DPCCH power is filtered in single carrier scenarios, where for a 10 ms TTI configuration the DPCCH power is filtered over 15 slots, while for a 2 ms TTI configuration the DPCCH power is filtered over 3 slots. This can be done under the assumption that the filtered samples of the DPCCH power on the 10 ms TTI carrier are available to be used for power allocation purposes at the 'not common' TTI boundaries of the 2 ms TTI case (i.e. when its TTI boundary is not a common TTI boundary with the 10 ms TTI). In this case, the text in the standard can be revised as follows:

Samples of $P_{DPCCH,comp,i}(t)$ shall be filtered using a filter period of 3 slotwise estimates of $P_{DPCCH,comp,i}(t)$ for the carrier frequency $f_i$ configured with 2 ms TTI, while samples of $P_{DPCCH,comp,i}(t)$ shall be filtered using a filter period of 15 slotwise estimates of $P_{DPCCH,comp,i}(t)$ for the carrier frequency $f_i$ configured with 10 ms TTI.

According to certain embodiments, systems and methods for reserving the power for the HS-DPCCH prior to the power allocation when DB-DC HSUPA and/or DC-HSUPA is configured with 10 ms TTI on both uplink carrier frequencies, may include any of the following solutions:

In certain embodiments, the power that is reserved for the HS-DPCCH transmission at the moment of estimating the remaining power for scheduled E-DCH transmissions, could be derived as the maximum expected activity level of the HS-DPCCH, the power offset of the HS-DPCCH, and the DPCCH power. For example, the activity level of the HS-DPCCH could be given by both the occurrence of the ACK/NACK transmissions, and the CQI estimates which are periodically reported to the network. In this case, and only as an example the text in the standard might be revised as follows:

$P_{HS-DPCCH}$ represents the estimated HS-DPCCH transmit power and shall be calculated based on the estimated Primary Activated Frequency DPCCH power, and the greatest HS-DPCCH gain factor. In case a 10 ms TTI is configured on one or both uplink carrier frequencies, the $P_{HS-DPCCH}$ shall be derived as the maximum expected activity level of the HS-DPCCH transmissions accounting for both the ACK/NACK and CQI transmissions, along with the power offset of the HS-DPCCH, and an estimate (filtered/unfiltered) of the UL DPCCH power.

In certain embodiments, the power that is reserved for the HS-DPCCH transmissions at the moment of estimating the remaining power for scheduled E-DCH transmissions, may be derived as the average activity level of the HS-DPCCH transmissions obtained from filtering (either or both) the ACK/NACK and CQI transmissions, the power offset of the HS-DPCCH, and the UL DPCCH power. In this case, and only as an example the text in the standard might be revised as follows:

$P_{HS-DPCCH}$ represents the estimated HS-DPCCH transmit power and shall be calculated based on the estimated Primary Activated Frequency DPCCH power, and the greatest HS-DPCCH gain factor. In case a 10 ms TTI is configured on one or both uplink carrier frequencies, the $P_{HS-DPCCH}$ shall be derived as the average activity level of the HS-DPCCH transmissions obtained from a filtering (either or both) the ACK/NACK and CQI transmissions, along with the power offset of the HS-DPCCH, and an estimate (filtered/unfiltered) of the UL DPCCH power.

Figure 5:
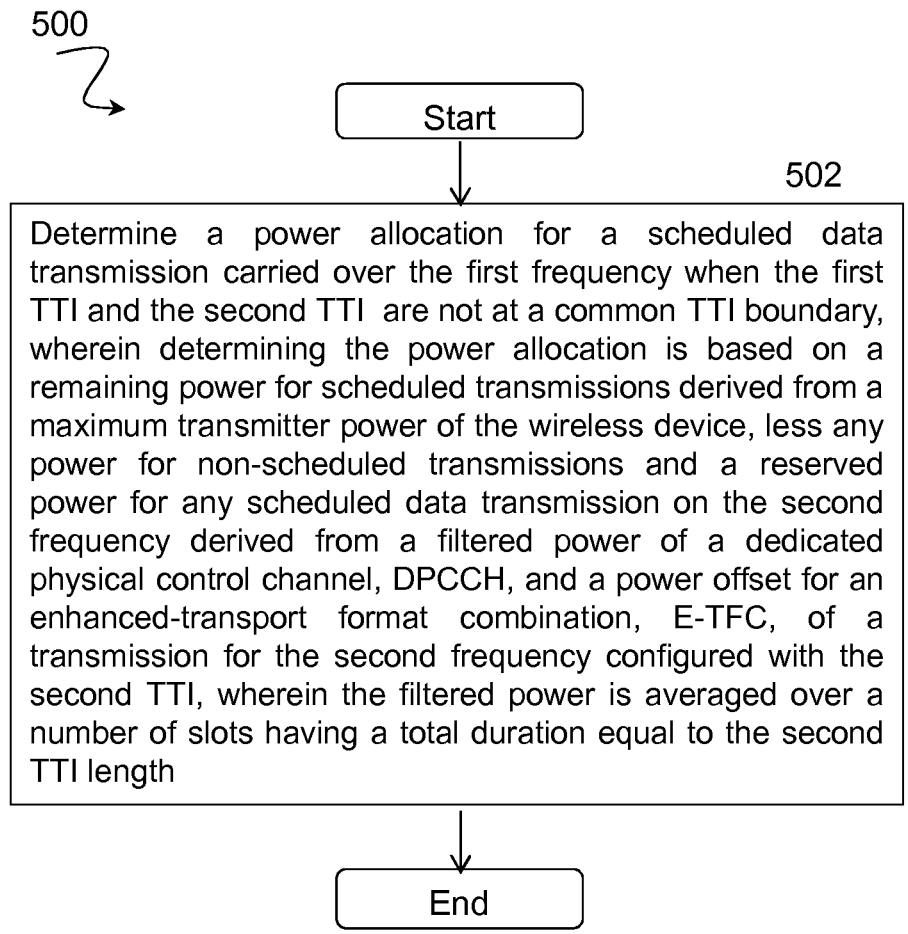
FIG. 5 illustrates an exemplary method by a wireless device for handling power allocation in UL multicarrier scenarios for mixed TTIs, in accordance with certain embodiments.

FIG. 5 illustrates an exemplary method 500 by a wireless device for handling power allocation during a multicarrier operation having a mixed TTI configuration where a first TTI configured on a first frequency is configured with a shorter length than a second TTI configured on a second frequency. The method begins at step 502, when wireless device 110 determines a power allocation for a scheduled data transmission carried over the first frequency when the first TTI and the second TTI are not at a common TTI boundary.

According to certain embodiments, the power allocation may be determined based on a remaining power for scheduled transmissions derived from a maximum transmitter power of the wireless device, less any power for non-scheduled transmissions and a reserved power for any scheduled data transmission on the second frequency derived from a filtered power of the DPCCH and a power offset for an E-TFC of a transmission for the second frequency configured with the second TTI. The filtered power is averaged over a number of slots having a total duration equal to the second TTI length.

In a particular embodiment and as described above, the remaining power on which the power allocation for the scheduled data transmission on the first frequency is determined as:

$$P_{remaining,s} = \max(PMax - \Sigma_i P_{DPCCH,target,i} - P_{HS-DPCCH} - P_{DPDCH} - P_{non-SG} - P_k, 0)$$

In the equation, PMax may represent the maximum transmitter power of the wireless device. $P_{DPCCH,target,i}$ may represent the filtered power for the first TTI of the DPCCH for a carrier with an index, i, at a time, t, wherein index i has values corresponding to both the first frequency and the second frequency. More specifically, $P_{DPCCH,target,i}$ may be said to represent the filtered power for the first TTI of the DPCCH for a carrier with an index, i, at a time, t with the sum running over a first carrier on the first frequency and a second carrier on the second frequency. $P_{HS-DPCCH}$ may represent a power of a High-Speed Dedicated Physical Control Channel (HS-DPCCH) based on the $P_{DPCCH,target,i}$ of a particular one of the first frequency or the second frequency on which the HS-DPCCH is configured and the power offset. Likewise, $P_{DPDCH}$ may represent a power of a Dedicated Physical Data Channel (DPDCH) based on the $P_{DPCCH,target,i}$ of the particular one of the first frequency or the second frequency on which the DPDCH is configured and the power offset $P_{non-SG}$ represents a power for any non-scheduled E-DPCCH data transmissions based on the $P_{DPCCH,target,i}$ of the particular one of the first frequency and the second frequency on which the non-scheduled E-DPCCH data transmissions are configured and the power offset. Finally, $P_k$ may represent the reserved power for the scheduled data transmissions on the second frequency by using the filtered power of the DPCCH and the power offset for an the enhanced-transport format combination, E-TFC, of a the scheduled data transmission for the second frequency. In other words $P_k$ is based on or derived from the filtered power of the DPCCH and the power offset for an the enhanced-transport format combination, E-TFC, of a the scheduled data transmission for the second frequency.

According to certain embodiments, the first TTI configured on the first frequency is 2 ms and the second TTI configured on the second frequency is 10 ms, and the filtered power includes an average of a power per slot over the number of slots equal to a respective TTI length. In a particular embodiment, for example, determining the estimate of $P_{DPCCH,target,i}$ may include averaging the filtered power over three slots for the first TTI of 2 ms configured on the first frequency and averaging the filtered power over 15 slots for the second TTI of 10 ms configured on the second frequency.

According to certain embodiments, an estimate of the HS-DPCCH power used in the reserved power for the primary activated frequency may be based on a greatest HS-DPCCH power offset and a maximum possible activity level of a HS-DPCCH.

According to certain embodiments, the first TTI may be configured on a primary uplink frequency, and the second TTI may be configured on a secondary uplink frequency. In an alternative embodiment, the first TTI is configured on a secondary uplink frequency, and the second TTI is configured on a primary uplink frequency.

In a mixed TTI scenario, the method may also include determining a power allocation for the first and second frequencies at a common boundary. In certain embodiments, the technique previously used for determining power allocation prior to Rel-14 may be used. Specifically, a total available power may be based on the remaining power for the system wherein the remaining power for the system is based on a filtered power of the DPCCH for each of the first frequency and the second frequency, and a respective scheduled grant for the particular one of the first frequency and the second frequency as a proportion of a total power reserved for the other one of the first and second frequency. The filtered power may be filtered over a number of slots having a total duration equal to a TTI length for a particular one of the first frequency and the second frequency. In a particular embodiment, for example, the power allocation may be determined as:

$$P_i = P_{remaining,s} \frac{P_{DPCCH,target,i} SG_i}{\sum_k P_{DPCCH,target,k} SG_k}$$

The remaining power, $P_{remaining,s}$, for the scheduled data transmission may be determined as:

$$P_{remaining,s} = \max(PMax - \Sigma_i P_{DPCCH,target,i} - P_{HS-DPCCH} - P_{DPDCH} - P_{non-SG}, 0);$$

In the equation, PMax may represent the maximum transmitter power of the wireless device. $P_{DPCCH,target,i}$ may represent the filtered power for the first TTI of the DPCCH for a carrier with an index, i, at a time, t, wherein index i has values corresponding to both the first frequency and the second frequency. More specifically, $P_{DPCCH,target,i}$ may be said to represent the filtered power for the first TTI of the DPCCH for a carrier with an index, i, at a time, t with the sum running over a first carrier on the first frequency and a second carrier on the second frequency. $P_{HS-DPCCH}$ may represent a power of the HS-DPCCH based on the $P_{DPCCH,target,i}$ of a particular one of the first frequency or the second frequency on which the HS-DPCCH is configured and the power offset. $P_{DPDCH}$ may represent a power of the DPDCH based on the $P_{DPCCH,target,i}$ of the particular one of the first frequency or the second frequency on which the DPDCH is configured and the power offset. Finally, $P_{non-SG}$ may represent a power for any non-scheduled E-DPCCH data transmissions based on the $P_{DPCCH,target,i}$ of the particular one of the first frequency or the second frequency on which the non-scheduled E-DPCCH data transmissions are configured and the power offset.

Figure 6:
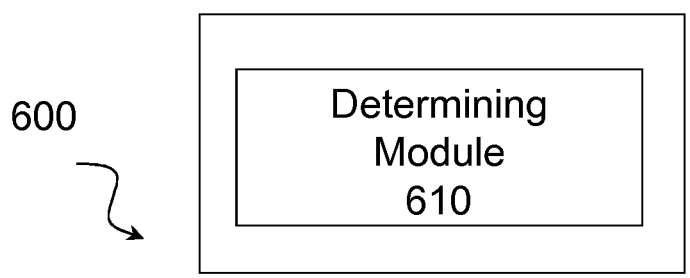
FIG. 6 illustrates an exemplary virtual computing device for handling power allocation in UL multicarrier scenarios for mixed TTIs, in accordance with certain embodiments.

In certain embodiments, the method for power allocation in uplink multicarrier scenarios for mixed transmission time intervals as described above may be performed by a virtual computing device. FIG. 6 illustrates an example virtual computing device 600 for power allocation in UL multicarrier scenarios for mixed TTIs, according to certain embodiments. In certain embodiments, virtual computing device 600 may include modules for performing steps similar to those described above with regard to the method illustrated and described in FIG. 5. For example, virtual computing device 600 may include at least one determining module 610 and any other suitable modules for power allocation in UL multicarrier scenarios for mixed TTIs. In some embodiments, one or more of the modules may be implemented using one or more processor 320 of FIG. 3. In certain embodiments, the functions of two or more of the various modules may be combined into a single module.

The determining module 610 may perform the determining or calculating functions of virtual computing device 600. For example, in a particular embodiment, determining module 610 may determine a power allocation for a scheduled data transmission carried over the first frequency when the first TTI and the second TTI are not at a common TTI boundary. For example, the power allocation may be determined based on a remaining power for scheduled transmissions derived from a maximum transmitter power of the wireless device, less any power for non-scheduled transmissions and a reserved power for any scheduled data transmission on the second frequency derived from a filtered power of the DPCCH and a power offset for an E-TFC of a transmission for the second frequency configured with the second TTI. The filtered power is averaged over a number of slots having a total duration equal to the second TTI length.

Other embodiments of virtual computing device 600 may include additional components beyond those shown in FIG. 6 that may be responsible for providing certain aspects of the radio node's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 7:
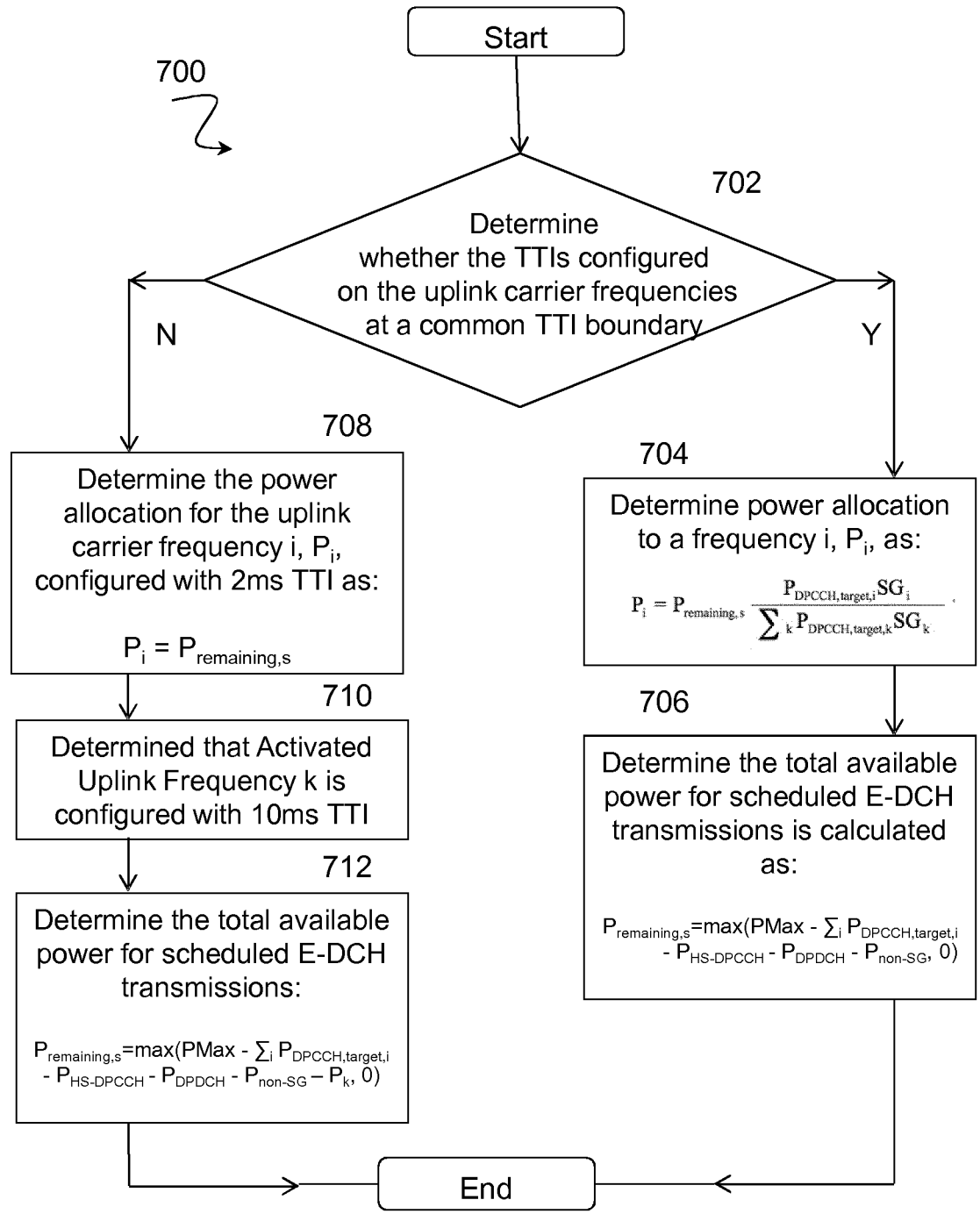
FIG. 7 illustrates another exemplary method by a wireless device for handling power allocation in UL multicarrier scenarios for mixed TTIs, in accordance with certain embodiments.

FIG. 7 illustrates another exemplary method 700 by a radio node power allocation in uplink multicarrier scenarios for mixed transmission time intervals, in accordance with certain embodiments. The method begins at step 702 when it is determined whether the TTIS configured on the uplink carrier frequencies are at a common TTI boundary.

If the TTIs configured on the uplink carrier frequencies are at a common boundary, then the method goes to step 704 where the power allocation to a frequency i, $P_i$, is calculated as:

$$P_i = P_{remaining,s} \frac{P_{DPCCH,target,i} SG_i}{\sum_k P_{DPCCH,target,k} SG_k}$$

where $P_{remaining,s}$ is the remaining power for scheduled transmissions once the power for non-scheduled transmissions has been taken into account, $P_{DPCCH,target,i}$ is the filtered DPCCH power, and $SG_i$ is the Serving Grant on frequency i.

At step 706, where the TTIs configured on the uplink carrier frequencies are at a common TTI boundary, the total available power for scheduled E-DCH transmissions is calculated as:

$$P_{remaining,s} = \max(PMax - \Sigma_i P_{DPCCH,target,i} - P_{HS-DPCCH} - P_{DPDCH} - P_{non-SG}, 0).$$

On the other hand, if at step 702, the TTIs configured on the uplink carrier frequencies are not at a common TTI boundary, the method goes to step 508 and the power allocation for the uplink carrier frequency i, $P_i$, configured with 2 ms TTI is calculated as:

$$P_i = P_{remaining,s}$$

where $P_{remaining,s}$ is the remaining power for scheduled transmissions once the power for non-scheduled transmissions has been taken into account.

At step 710, it is determined that Activated Uplink Frequency k is configured with 10 ms TTI. At step 712, the total available power for scheduled E-DCH transmissions is defined by:

$$P_{remaining,s} = \max(PMax - \Sigma_i P_{DPCCH,target,i} - P_{HS-DPCCH} - P_{DPDCH} - P_{non-SG} - P_k, 0).$$

In a particular embodiment, the power $P_k$ may be taken to be the power that was determined in the last power allocation for carrier k. In another particular embodiment, it can be more accurately estimated by using the current filtered power of the DPCCH and the power offset for the E-TFC of the transmission for the carrier k.

Accordingly, the methods described above include that when the configured TTIs on the uplink carrier frequencies are at a common TTI boundary (this encompassed not only a mixed TTI configuration, but also 2 ms+2 ms and 10 ms+10 ms), the power allocation should be performed as it is done prior to Rel-14. On the other hand, when the configured TTIs on the uplink carrier frequencies are not at a common TTI boundary (this refers to the mixed TTI configuration only, including 2 ms+10 ms and 10 ms+2 ms, including 2 ms+10 ms and 10 ms+2 ms), the power allocation for the carrier configured with 2 ms TTI is updated at its 'not common' TTI boundary (i.e. when its TTI boundary is not a common TTI boundary with the 10 ms TTI), accounting for a reserved power associated to the carrier transmitting on a 10 ms TTI basis which is updated only at common TTI boundaries.

Figure 8:
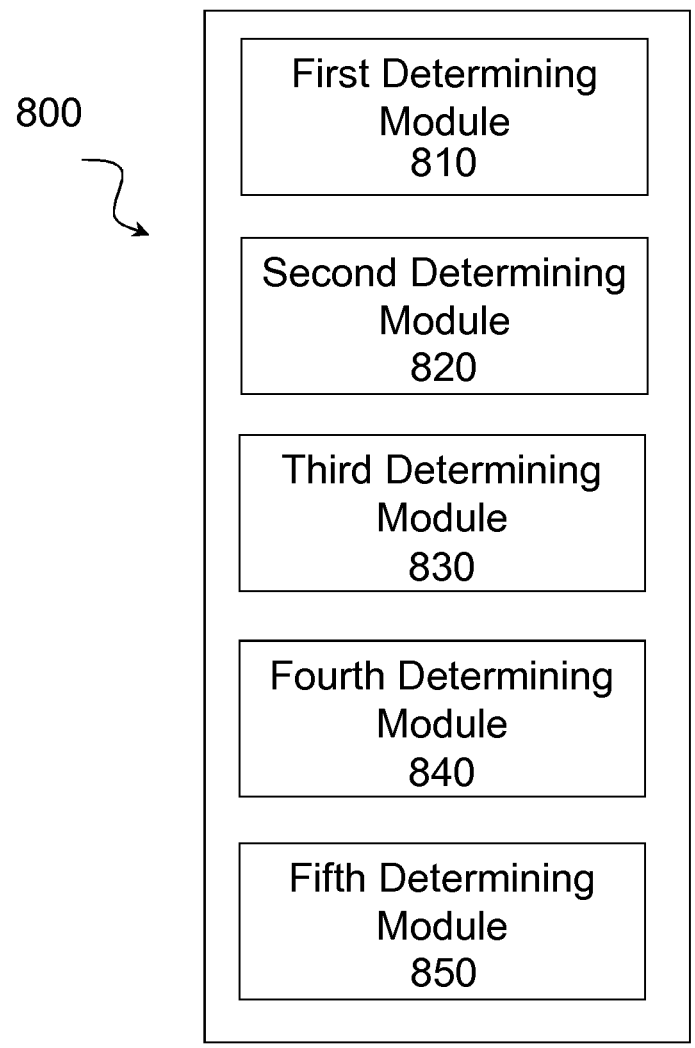
FIG. 8 illustrates another exemplary virtual computing device for handling power allocation in UL multicarrier scenarios for mixed TTIs, in accordance with certain embodiments.

In certain embodiments, the method for power allocation in uplink multicarrier scenarios for mixed transmission time intervals as described above may be performed by a virtual computing device. FIG. 8 illustrates an example virtual computing device 800 for power allocation in uplink multicarrier scenarios for mixed transmission time intervals, according to certain embodiments. In certain embodiments, virtual computing device 800 may include modules for performing steps similar to those described above with regard to the method illustrated and described in FIG. 7. For example, virtual computing device 800 may include a first determining module 810, a second determining module 820, a third determining module 830, a fourth determining module 840, a fifth determining module 850, a sixth determining module 860, and any other suitable modules for power allocation in UL multicarrier scenarios for mixed TTIs. In some embodiments, one or more of the modules may be implemented using processors 320 of FIG. 3. In certain embodiments, the functions of two or more of the various modules may be combined into a single module.

The first determining module 810 may perform certain of the determining or calculating functions of virtual computing device 800. For example, in a particular embodiment, determining module 810 may determine whether the TTIs configured on the uplink carrier frequencies are at a common TTI boundary.

The second determining module 820 may perform certain other of the determining or calculating functions of virtual computing device 800. For example, in a particular embodiment, if the TTIs configured on the UL carrier frequencies are at a common TTI boundary, second determining module 820 may determine power allocation to a a frequency i, $P_i$, is calculated as:

$$P_i = P_{remaining,s} \frac{P_{DPCCH,target,i} SG_i}{\Sigma_k P_{DPCCH,target,k} SG_k}$$

The third determining module 830 may perform certain other of the determining or calculating functions of virtual computing device 800. For example, in a particular embodiment, if the TTIs configured on the UL carrier frequencies are at a common TTI boundary, third determining module 830 may also determine the total available power for scheduled E-DCH transmissions as:

$$P_{remaining,s} = \max(PMax - \Sigma_i P_{DPCCH,target,i} - P_{HS-DPCCH} - P_{DPDCH} - P_{non-SG}, 0).$$

The fourth determining module 840 may perform certain other of the determining or calculating functions of virtual computing device 800. For example, in a particular embodiment, if the TTIs configured on the UL carrier frequencies are not at a common TTI boundary, fourth determining module 840 may determine power allocation to a frequency i, $P_i$, is calculated as:

$$P_i = P_{remaining,s}$$

The fifth determining module 850 may perform certain other of the determining or calculating functions of virtual computing device 800. For example, in a particular embodiment, if the TTIs configured on the UL carrier frequencies are not at a common TTI boundary, fifth determining module 850 may determine that Activated Frequency Uplink, k, is configured with 10 ms TTI.

The sixth determining module 860 may perform certain other of the determining or calculating functions of virtual computing device 800. For example, in a particular embodiment, if the TTIs configured on the UL carrier frequencies are not at a common TTI boundary, sixth determining module 860 may determine the total available power for scheduled E-DCH transmissions is defined by:

$$P_{remaining,s} = \max(PMax - \Sigma_i P_{DPCCH,target,i} - P_{HS-DPCCH} - P_{DPDCH} - P_{non-SG} - P_k, 0)$$

Other embodiments of virtual computing device 8600 may include additional components beyond those shown in FIG. 8 that may be responsible for providing certain aspects of the radio node's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 9:
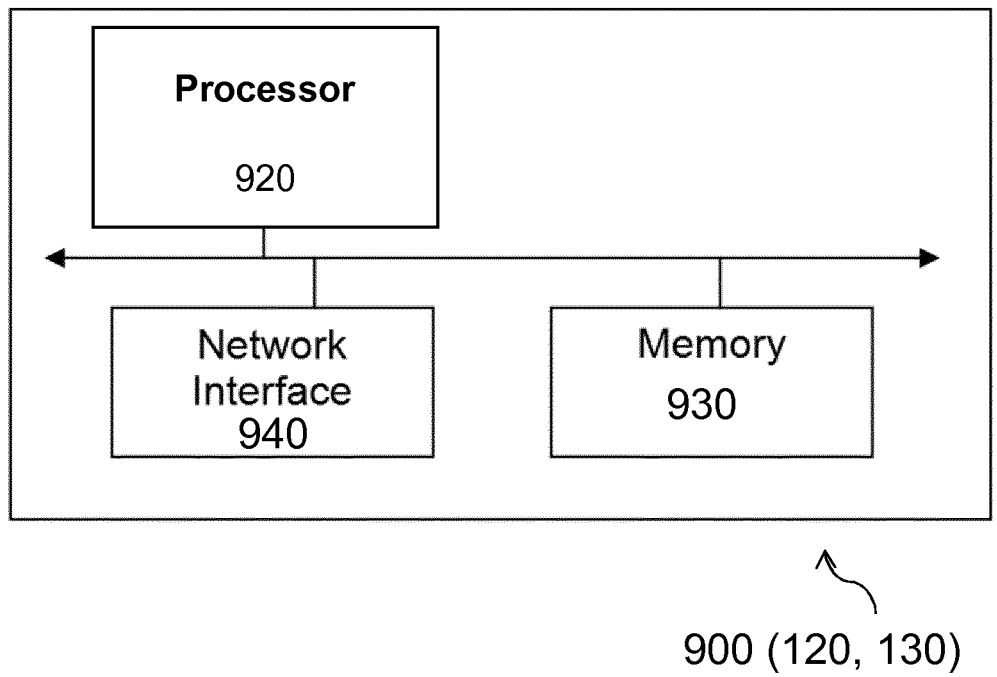
FIG. 9 illustrates an exemplary radio network controller or core network node, in accordance with certain embodiments.

FIG. 9 illustrates an exemplary radio network controller or core network node 700, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 900 include processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 900, etc.

Processor 920 may include any suitable combination of hardware and software implemented in one or more modules to execute instructions and manipulate data to perform some or all of the described functions of the radio network controller or core network node 900. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Certain embodiments of the present disclosure may provide one or more technical advantages. For example, certain embodiments may provide resolve the issue of not knowing at which the TTI boundary the power allocation should be performed for DB-DC HSUPA and/or DC-HSUPA scenarios that are configured with different TTIs on the uplink carrier frequencies. Another advantage may be that the existing power allocation procedure (originally made for handling a 2 ms TTI case only) is made compatible with the scenario where DB-DC HSUPA and/or DC-HSUPA is configured with 10 ms TTI on both uplink carrier frequencies, or when DB-DC HSUPA and/or DC-HSUPA is used in scenarios with a mixed TTI configuration. Still another advantage may be that the techniques provided indicates to higher layers the proper estimate of the remaining power that can be used for performing scheduled E-DCH transmissions, when DB-DC HSUPA and/or DC-HSUPA deals with the same or different TTIs configured on the uplink carrier frequencies. Still another advantage may be that the issue of not knowing how the filtering of the DPCCH power should be performed when DB-DC HSUPA and/or DC-HSUPA is configured with different TTIs on the uplink carrier frequencies is resolved.

Further, another technical advantage may be that the systems and methods provides an estimate on how much power should be reserved for the HS-DPCCH channel which is transmitted on a 2 ms TTI basis, when DB-DC HSUPA and/or DC-HSUPA is configured with 10 ms TTI on both uplink carrier frequencies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Some of the terms described herein may be explained in more detail according to the following description.

$P_{DPCCH,i}(t)$ represents a slotwise estimate of the current UE DPCCH power for carrier with index i (i=0,1) at time t. If at time t, the UE is transmitting a compressed mode frame then $P_{DPCCH,comp,i}(t)=P_{DPCCH,i}(t)\times(N_{pilot,C}/N_{pilot,N})$ else $P_{DPCCH,comp,i}(t)=P_{DPCCH,i}(t)$. If the UE is not transmitting uplink DPCCH on the Activated Uplink Frequency i during the slot at time t, either due to compressed mode gaps or when discontinuous uplink DPCCH transmission operation is enabled then the power shall not contribute to the filtered result. Samples of $P_{DPCCH,comp,i}(t)$ shall be filtered using a filter period of 3 slotwise estimates of $P_{DPCCH,comp,i}(t)$ if a 2 ms TTI is in use on carrier i, or a filter period of 15 slotwise estimates of $P_{DPCCH,comp,i}(t)$ if a 10 ms TTI is in use on carrier i. The accuracy of the $P_{DPCCH},i$ estimate shall be at least that specified in table 1.

If the target E-DCH TTI for which RPM is being evaluated does not correspond to a compressed mode frame then $P_{DPCCH,target,i}=P_{DPCCH,filtered,i}$.

If the target E-DCH TTI for which RPM is being evaluated corresponds to a compressed mode frame then $P_{DPCCH,target,i}=P_{DPCCH,filtered,i}\times(N_{pilot,N}/N_{pilot,C})$. $N_{pilot,N}$ and $N_{pilot,C}$ are numbers of pilot symbols as defined in 3GPP TS 25.214 "Physical layer procedures (FDD)".

$P_{HS\text{-}DPCCH}$ represents the estimated HS-DPCCH transmit power and shall be calculated based on the estimated Primary Activated Frequency DPCCH power, and the greatest HS-DPCCH gain factor and assuming the maximum possible activity of HS-DPCCH over a 10 ms period if a 10 ms TTI is in use. If two HS-DPCCHs are transmitted, $P_{HS}$-DPCCH is the maximum combined estimated transmit power from both HS-DPCCHs. Rules for calculating the HS-DPCCH gain factors from the most recent signalled $D_{ACK}$, $D_{NACK}$ and $D_{CQI}$ according to the specific multicarrier and MIMO configuration and activation status of the secondary HS-DSCH serving cells are defined in subclause 5.1.2.5A in 3GPP TS 25.214 "Physical layer procedures (FDD)".

$P_{DPDCH}$ represents estimated DPDCH transmit power on Primary Activated Frequency based on $P_{DPDCH,target}$ and the gain factors from the TFC selection that has already been made. If the target E-DCH TTI for which NRPMj is being evaluated corresponds to a compressed mode frame then the modification to the gain factors which occur due to compressed mode shall be included in the estimate of $P_{DPDCH}$.

$P_{non-SG}$ represents the power pre-allocated for non-scheduled transmissions for Primary Uplink Frequency, as defined by 3GPP TS 25.321 "MAC protocol specification". An estimate of the E-DPCCH power required for non-scheduled transmissions may be included in $P_{non-SG}$.

When the UE has more than one Activated Uplink Frequency and no retransmission is required, or when the UE has more than one Activated Uplink Frequency and two retransmissions are required, the UE shall estimate the normalised remaining power margin available for E-TFC selection using the power allocated to the Primary Uplink Frequency $P_{allocated,1}$ and the power allocated to the Secondary Uplink Frequency $P_{allocated,2}$ defined by:

$$P_{allocated,1} = P_1 + P_{non-SG},$$

$$P_{allocated,2} = P_2$$

where $P_i$ represents the maximum remaining allowed power for scheduled transmissions for the Activated Uplink Frequency i=1,2, where index 1 and index 2 correspond to the index of the Primary Uplink Frequency and the index of the Secondary Uplink Frequency as defined by 3GPP TS 25.321: "MAC protocol specification".

When the UE has more than one Activated Uplink Frequency and one retransmission is required in one Activated Uplink Frequency, the UE shall estimate the normalised remaining power margin available for E-TFC selection using the power allocated to the Activated Uplink Frequency for which a retransmission is required $P_{allocated,x}$ and on the power allocated to the Activated Uplink Frequency for which no retransmission is required $P_{allocated,y}$ defined by:

$$P_{allocated,y} = PMax - P_{HS-DPCCH} - S_i P_{DPCCH,target,i} - P_{DPDCH} - P_{E-DPCCH,x} - P_{E-DPDCH,x}$$

$$P_{allocated,x} = P_{E-DPCCH,x} + P_{E-DPDCH,x}$$

where $P_{E-DPDCH,x}$ represents the estimated E-DPDCH transmit power for the Uplink Frequency for which a retransmission is required. The estimate is based on $P_{DPCCH,target,x}$ where x is denoting the index of the Activated Uplink Frequency on which a retransmission required and the E-DPDCH gain factor which will be used for the retransmission.

$P_{E-DPCCH,x}$ represents the estimated E-DPCCH transmit power for the Uplink Frequency for which a retransmission is required. The estimate is based on $P_{DPCCH,target,x}$ where x is denoting the index of the Activated Uplink Frequency on which a retransmission is required and the E-DPCCH gain factor which will be used for the retransmission.

When the UE has more than one Activated Uplink Frequency, the UE shall estimate the normalised remaining power margin available for E-TFC selection for the Activated Uplink Frequency i based on the following equation for E-TFC candidate j:

$$NRPM_{i,j} = (P_{allocated,i} - P_{E-DPCCHi,i}) / P_{DPCCH,target,i}$$

where $P_{E-DPCCH,j,i}$ represents the estimated E-DPCCH transmit power for E-TFCI$_j$ on the Activated Uplink Frequency i. If E-TFCI$_j$ is smaller than or equal to E-TFCI$_{ec,boost}$ the estimate is based on $P_{DPCCH,target,i}$ and the E-DPCCH gain factor calculated using the most recent signalled value of DE-DPCCH. If E-TFCI$_j$ is greater than E-TFCI$_{ec,boost}$ the estimate is based on the E-DPCCH gain factor, $\beta_{ec,j}$, which is calculated for E-TFCI$_j$ using the procedure in [18]. If the target E-DCH TTI for which NRPM$_{j,i}$ is being evaluated corresponds to a compressed mode frame then the modification to the gain factors which occur due to compressed mode shall be included in the estimation.

In the case that the target E-DCH TTI for which E-TFC restriction is being considered does not belong to a compressed mode frame then if $NRPM_{j,i} \geq \Sigma(\beta_{ed,j}/\beta_c)^2$ then E-TFC$_j$ can be supported on the Activated Uplink Frequency i, otherwise it cannot be supported on that Activated Uplink Frequency.

In the case that the target E-DCH TTI for which E-TFC restriction is being considered belongs to a compressed mode frame then if $NRPM_{j,i} \geq \Sigma(\beta_{ed,C,j}/\beta_{c,C})^2$ then E-TFC$_j$ can be supported on the Activated Uplink Frequency i, otherwise it cannot be supported on that Activated Uplink Frequency.

$\beta_{ed,j}/\beta_c$ and $\beta_{ed,C,j}/\beta_{c,C}$ is the quantized amplitude ratio.

TABLE 1

Accuracy requirements for the estimate of $P_{DPCCH}$ used in E-TFC restriction

| Total UE output power value (dBm) | $P_{DPCCH}$ accuracy (dB) (note 1) |
|---|---|
| 25 <= total output power < 34 | note 2 |
| 24 <= total output power < 25 | ±2.0 |
| 23 <= total output power < 24 | ±2.0 |
| 22 <= total output power < 23 | ±2.0 |
| 21 <= total output power < 22 | ±2.0 |
| 20 <= total output power < 21 | ±2.5 |
| 19 <= total output power < 20 | ±3.0 |
| 18 <= total output power < 19 | ±3.5 |
| 17 <= total output power < 18 | ±4.0 |
| 16 <= total output power < 17 | ±4.0 |
| 15 <= total output power < 16 | ±4.0 |
| 14 <= total output power < 15 | ±4.0 |
| 13 <= total output power < 14 | ±4.0 (power class 4) ±6.0 (power class 3) |
| 12 <= total output power < 13 | ±4.0 (power class 4) ±6.0 (power class 3) |
| 11 <= total output power < 12 | ±4.0 (power class 4) ±6.0 (power class 3) |
| −50 <= total output power < 11 | ±6.0 |

NOTE 1:
$P_{DPCCH}$ accuracy is the difference between the estimate of $P_{DPCCH}$ used by the UE for the purposes of E-TFC selection and the actual power of the DPCCH being transmitted
NOTE 2:
No tolerance is specified.

The invention claimed is:

1. A method by a wireless device for handling power allocation during a multicarrier operation having a mixed transmission time interval (TTI) configuration, wherein a first TTI configured on a first frequency is configured with a shorter length than a second TTI configured on a second frequency, the method comprising:

determining a power allocation for a scheduled data transmission carried over the first frequency when the first TI and the second TTI are not at a common TTI boundary, wherein determining the power allocation is based on a remaining power for scheduled transmissions, wherein the remaining power is based on a maximum transmitter power of the wireless device, deducting any power for non-scheduled transmissions and a reserved power for any scheduled data transmission on the second frequency, wherein the reserved power is based on a filtered power of a dedicated physical control channel, DPCCH, and a power offset for an enhanced-transport format combination, E-TFC, of a transmission for the second frequency configured with the second TTI, wherein the filtered power is averaged over a number of slots having a total duration equal to the second TTI length.

2. The method of claim 1, wherein the remaining power on which the power allocation for the scheduled data transmission on the first frequency is determined as:

$$P_{remaining,s} = \max(P\text{Max} - \Sigma_i P_{DPCCH,target,i} - P_{HS-DPCCH} - P_{DPDCH} - P_{non-SG} - P_k, 0);$$

wherein PMax represents the maximum transmitter power of the wireless device, wherein $P_{DPCCH,target,i}$ represents the filtered power of the DPCCH for a carrier with an index, i, at a time, t, wherein index i has values corresponding to both the first frequency and the second frequency, wherein $P_{HS-DPCCH}$ represents a power of a High-Speed Dedicated Physical Control Channel (HS-DPCCH) based on the $P_{DPCCH,target,i}$ of a particular one of the first frequency or the second frequency on which the HS-DPCCH is configured and the power offset, wherein $P_{DPDCH}$ represents a power of a Dedicated Physical Data Channel (DPDCH) based on the $P_{DPCCH,target,i}$ of a particular one of the first frequency or the second frequency on which the DPDCH is configured and the power offset, wherein $P_{non-SG}$ represents a power for any non-scheduled E-DCH data transmissions based on the $P_{DPCCH,target,i}$ of a particular one of the first frequency and the second frequency on which the non-scheduled E-DCH data transmissions are configured and the power offset, and wherein $P_k$ represents the reserved power for the scheduled data transmissions on the second frequency based on the filtered power of the DPCCH and the power offset for an the enhanced-transport format combination, E-TFC, of the scheduled data transmission for the second frequency.

3. The method of claim 1, wherein the filtered power comprises an average of a power per slot over the number of slots equal to a respective TTI length.

4. The method of claim 1, wherein:
the first TTI configured on the first frequency is 2 ms, and
the second TTI configured on the second frequency is 10 ms.

5. The method of claim 2, wherein the $P_{DPCCH,target}$ is determined by:
for the first TTI of 2 ms configured on the first frequency, averaging the filtered power over 3 slots, and
for the second TTI of 10 ms configured on the second frequency, averaging the filtered power over 15 slots.

6. The method of claim 1, wherein the HS-DPCCH power used in the reserved power for the primary activated frequency is based on a greatest HS-DPCCH gain factor, and a maximum possible activity level of the HS-DPCCH.

7. The method of claim 1, wherein:
the first TTI is configured on a primary uplink frequency, and
the second TTI is configured on a secondary uplink frequency.

8. The method of claim 1, wherein:
the first TTI is configured on a secondary uplink frequency, and
the second TTI is configured on a primary uplink frequency.

9. The method of claim 1, further comprising:
determining a power allocation for both the first frequency and the second frequency when the first TTI and second TTI are at a common boundary wherein a total available power is based on the remaining power for the system wherein the remaining power for the system is based on a filtered power of a dedicated physical control channel, DPCCH, for each of the first frequency and the second frequency, wherein the filtered power is filtered over a number of slots having a total duration equal to a TTI length for a particular one of the first frequency and the second frequency and a respective scheduled grant for the particular one of the first frequency and the second frequency as a proportion of a total power reserved for the other one of the first and second frequency.

10. The method of claim 9, wherein the power allocation is determined as:

$$P_i = P_{remaining,s} \frac{P_{DPCCH,target,i} SG_i}{\sum_k P_{DPCCH,target,k} SG_k};$$

wherein the remaining power, $P_{remaining,s}$, for the scheduled data transmission is determined as:

$$P_{remaining,s} = \max(P\text{Max} - \Sigma_i P_{DPCCH,target,i} - P_{HS-DPCCH} - P_{DPDCH} - P_{non-SG}, 0);$$

wherein PMax represents the maximum transmitter power of the wireless device, wherein $P_{DPCCH,target,i}$ represents the filtered power of the DPCCH for a carrier with an index, i, at a time, t, wherein index i has values corresponding to both the first frequency and the second frequency, wherein $P_{HS-DPCCH}$ represents a power of a High-Speed Dedicated Physical Control Channel (HS-DPCCH) based on the $P_{DPCCH,target,i}$ of a particular one of the first frequency or the second frequency on which the HS-DPCCH is configured and the power offset, wherein $P_{DPDCH}$ represents a power of a Dedicated Physical Data Channel (DPDCH) based on the $P_{DPCCH,target,i}$ of a particular one of the first frequency or the second frequency on which the DPDCH is configured and the power offset, and wherein $P_{non-SG}$ represents a power for any non-scheduled E-DCH data transmissions based on the $P_{DPCCH,target,i}$ of a particular one of the first frequency or the second frequency on which the non-scheduled E-DCH data transmissions are configured and the power offset.

11. A wireless device for handling the power allocation during multicarrier operation, wherein a first TTI configured on a first frequency is configured with a shorter length than a second TTI configured on a second frequency, the wireless device comprising:

memory storing instructions; and a processor operable to execute the instructions to cause the wireless device to:

determine a power allocation for a scheduled data transmission carried over the first frequency when the first TTI and the second TTI are not at a common TTI boundary, wherein determining the power allocation is based on a remaining power for scheduled transmissions wherein the remaining power is derived from a maximum transmitter power of the wireless device, deducting any power for non-scheduled transmissions and a reserved power for any scheduled data transmission on the second frequency, the reserved power being derived from a filtered power of a dedicated physical control channel, DPCCH, and a power offset for an enhanced-transport format combination, E-TFC, of a transmission for the second frequency configured with the second TI, wherein the filtered power is averaged over a number of slots having a total duration equal to the second TTI length.

12. The wireless device of claim 11, wherein the remaining power on which the power allocation for the scheduled data transmission on the first frequency is determined as:

$$P_{remaining,s} = \max(P\,Max - \Sigma_i P_{DPCCH,target,i} - P_{HS-DPCCH} - P_{DPDCH} - P_{non-SG} - P_k, 0);$$

wherein PMax represents the maximum transmitter power of the wireless device, wherein $P_{DPCCH,target,i}$ represents the filtered power of the DPCCH for a carrier with an index, i, at a time, t, wherein index i has values corresponding to both the first frequency and the second frequency, wherein $P_{HS-DPCCH}$ represents a power of a High-Speed Dedicated Physical Control Channel (HS-DPCCH) based on the $P_{DPCCH,target,i}$ of a particular one of the first frequency or the second frequency on which the HS-DPCCH is configured and the power offset, wherein $P_{DPDCH}$ represents a power of a Dedicated Physical Data Channel (DPDCH) based on the $P_{DPCCH,target,i}$ of a particular one of the first frequency or the second frequency on which the DPDCH is configured and the power offset, wherein $P_{non-SG}$ represents a power for any non-scheduled E-DCH data transmissions based on the $P_{DPCCH,target,i}$ of a particular one of the first frequency and the second frequency on which the non-scheduled E-DCH data transmissions are configured and the power offset, and wherein $P_k$ represents the reserved power for the scheduled data transmissions on the second frequency based on the filtered power of the DPCCH and the power offset for an the enhanced-transport format combination, E-TFC, of the scheduled data transmission for the second frequency.

13. The wireless device of claim 11, wherein the filtered power comprises an average of a power per slot over the number of slots equal to a respective TTI length.

14. The wireless device of claim 11, wherein:
the first TTI configured on the first frequency is 2 ms, and the second TTI configured on the second frequency is 10 ms.

15. The wireless device of claim 12, wherein the $P_{DPCCH,target}$, is determined by:

for the first TTI of 2 ms configured on the first frequency, averaging the filtered power over 3 slots, and for the second TTI of 10 ms configured on the second frequency, averaging the filtered power over 15 slots.

16. The wireless device of claim 11, wherein the HS-DPCCH power used in the reserved power for the primary activated frequency is based on a greatest HS-DPCCH gain factor and a maximum possible activity level of HS-DPCCH.

17. The wireless device of claim 11, wherein:
the first TTI is configured on a primary uplink frequency, and
the second TTI is configured on a secondary uplink frequency.

18. The wireless device of claim 11, wherein:
the first TTI is configured on a secondary uplink frequency, and
the second TTI is configured on a primary uplink frequency.

19. The wireless device of claim 11, wherein the processor is operable to execute the instructions to cause the wireless device to:

determine a power allocation for both the first frequency and the second frequency when the first TTI and second TTI are at a common boundary wherein a total available power is based on the remaining power for the system wherein the remaining power for the system is based on a filtered power of a dedicated physical control channel, DPCCH, for each of the first frequency and the second frequency, wherein the filtered power is filtered over a number of slots having a total duration equal to a TTI length for a particular one of the first frequency and the second frequency and a respective scheduled grant for the particular one of the first frequency and the second frequency as a proportion of a total power reserved for the other one of the first and second frequency.

20. The wireless device according to claim 19, wherein the power allocation is determined as:

$$P_i = P_{remaining,s} \frac{P_{DPCCH,target,i} SG_i}{\sum_k P_{DPCCH,target,k} SG_k};$$

wherein the remaining power, $P_{remaining,s}$, for the scheduled data transmission is determined as:

$$P_{remaining,s} = \max(P\,Max - \Sigma_i P_{DPCCH,target,i} - P_{HS-DPCCH} - P_{DPDCH} - P_{non-SG}, 0);$$

wherein PMax represents the maximum transmitter power of the wireless device, wherein $P_{DPCCH,target,i}$ represents the filtered power of the DPCCH for a carrier with an index, i, at a time, t, wherein index i has values corresponding to both the first frequency and the second frequency, wherein $P_{HS-DPCCH}$ represents a power of a High-Speed Dedicated Physical Control Channel (HS-DPCCH) based on the $P_{DPCCH,target,i}$ of a particular one of the first frequency or the second frequency on which the HS-DPCCH is configured and the power offset, wherein $P_{DPDCH}$ represents a power of a Dedicated Physical Data Channel (DPDCH) based on the $P_{DPCCH,target,i}$ of a particular one of the first frequency or the second frequency on which the DPDCH is configured and the power offset, and wherein $P_{non-SG}$ represents a power for any non-scheduled E-DCH data transmissions based on the $P_{DPCCH,target,i}$ of a particular one of the first frequency or the second frequency on which the non-scheduled E-DCH data transmissions are configured and the power offset.

21. A non-transitory program storage medium containing instructions capable of being executed on a processor which, when executed on a processor, perform any one of the method of claim 1.

* * * * *